United States Patent [19]

Johnson et al.

[11] Patent Number: 5,128,154

[45] Date of Patent: Jul. 7, 1992

[54] METHOD OF TREATING WINTERGREEN FLAVORS SO AS TO ELIMINATE UNDESIRABLE OFFNOTES ASSOCIATED THEREWITH

[75] Inventors: Sonya Johnson, Brookfield; Jayant C. Dave, Bloomingdale, both of Ill.

[73] Assignee: Wm. Wrigley Jr. Company, Chicago, Ill.

[21] Appl. No.: 737,836

[22] Filed: Jul. 29, 1991

Related U.S. Application Data

[63] Continuation of Ser. No. 457,318, Dec. 28, 1989, abandoned.

[51] Int. Cl.⁵ .................................................. A23G 3/30
[52] U.S. Cl. ........................................ 426/3; 426/533; 426/651; 424/48; 560/71
[58] Field of Search .................................... 426/3-6, 426/651, 533; 424/48; 560/71; 512/5

[56] References Cited

U.S. PATENT DOCUMENTS

| | | | |
|---|---|---|---|
| 1,814,853 | 7/1931 | Putnam | 560/71 |
| 1,905,144 | 4/1938 | Carswell et al. | 560/71 |
| 1,945,177 | 1/1934 | Carswell et al. | 560/71 |
| 2,827,452 | 3/1958 | Schlenk | 426/651 |
| 4,476,142 | 10/1984 | Netherwood | 426/651 |
| 4,613,513 | 9/1986 | Hussein | 426/651 |
| 4,724,151 | 2/1988 | Mansukhani et al. | 426/651 |
| 4,778,691 | 10/1988 | Todd, Jr. et al. | 426/600 |
| 4,844,883 | 7/1989 | Patel | 426/3 |
| 4,948,595 | 8/1990 | Patel | 426/651 |

OTHER PUBLICATIONS

The Chemistry of Essential Oils and Artificial Perfumes by Ernest J. Parry (1918); The Essential Oils by Ernest Guenther (1948).

*Primary Examiner*—Jeanette Hunter
*Attorney, Agent, or Firm*—Willian Brinks Olds Hofer Gilson & Lione

[57] ABSTRACT

A method of treating methyl salicylate flavor is provided washing the flavor with an aqueous alkaline solution having a pH in the range from about 8 to about 14.

32 Claims, No Drawings

METHOD OF TREATING WINTERGREEN FLAVORS SO AS TO ELIMINATE UNDESIRABLE OFFNOTES ASSOCIATED THEREWITH

This application is a continuation of application Ser. No. 07/457,318 filed on Dec. 28, 1989 now abandoned.

BACKGROUND OF THE INVENTION

The present invention relates to a method of treating wintergreen flavors so as to eliminate the undesirable off-notes occasionally associated therewith when such flavors are utilized in confectionary or medicinal products. More particularly, the present invention relates to a method of treating flavors and flavor blends having natural wintergreen oil, artificial wintergreen oil-methyl salicylate, and blends thereof with other flavors.

Flavors having wintergreen and/or methyl salicylate as a component may exhibit undesirable off-notes of varying intensity which have been characterized as being soapy, medicinal, antiseptic, musty, bitter, solventy, chemical, and plastic. It has been postulated that these flavors contain an impurity which is responsible for the undesirable off-notes occasionally associated therewith. Pursuant to the foregoing hypothesis, analytical tests have been conducted which show the presence of phenol in these flavors, and that the amount of phenol present is directly related to the intensity of the undesirable off-note. However, spiking "good" wintergreen flavor (i.e. flavor lacking undesirable off-notes) with phenol does not impart undesirable off-notes to the good flavor. Accordingly, it is presently believed that phenol is not the only, or perhaps not even the primary, contaminant responsible for the undesirable off-notes associated with the methyl salicylate based flavor. In fact, the phenol may simply be an indicator for the presence of some other unknown contaminant responsible for the undesirable off-notes associated with flavors having wintergreen oil and/or methyl salicylate as a component.

Whatever may be the cause of the undesirable off-notes manifested by such flavors, it has unexpectedly been discovered that washing the flavor with an aqueous alkaline solution eliminates the undesirable off-notes associated therewith without otherwise adversely affecting the flavor.

SUMMARY OF THE INVENTION

In accordance with one embodiment of the present invention, there is provided a method of manufacturing a chewing gum having a flavor comprising methyl salicylate wherein the chewing gum is free of the undesireable off-notes sometimes associated with products incorporating methyl salicylate based flavors. The method comprises washing the flavor with an aqueous alkaline solution having a pH in the range from about 8 to about 14, whereupon the washed flavor is mixed with the chewing gum so that the flavor comprises from about 0.1% to about 10% by weight of the chewing gum.

In accordance with another embodiment of the present invention, there is provided a method of treating a flavor comprising methyl salicylate so as to eliminate the undesirable off-notes associated therewith. This method comprises washing the flavor with an aqueous alkaline solution having a pH in the range from about 8 to about 14.

DETAILED DESCRIPTION OF PREFERRED EMBODIMENTS

The method of the present invention contemplates the treatment of any flavor or flavor blend comprising natural wintergreen oil, artificial wintergreen oil-methyl salicylate, or blends thereof. Both natural and artificial wintergreen flavors have methyl salicylate as a major component. Other naturally occurring oils which contain methyl salicylate include sweet birch oil, betula oil, and teaberry oil. Methyl salicylate may be added to the aforesaid naturally occurring oils to enhance their flavor character. The present invention contemplates the blending of the aforesaid flavors with any other flavor of food acceptable quality, with the subsequent treatment of the resulting blend according to the method of the present invention. Examples of flavors which may be blended with wintergreen or methyl salicylate containing flavors and subsequently treated according to the method of the present invention include essential oils, synthetic flavors, or mixtures thereof, including but not limited to, oils derived from plants and fruits such as citrus oils, fruit essences, peppermint oil, spearmint oil, clove oil, anise and the like. Also exemplary of flavor blends which contain methyl salicylate are root beer, traditional bubblegum flavor, and "tuity fruity." Artificial flavoring components are also contemplated for blending with methyl salicylate based flavor and subsequent treatment according to the method of the present invention. Those skilled in the art will recognize that natural and artificial flavors may be combined with wintergreen and methyl salicylate containing flavors in any manner. All such flavors and blends are contemplated for use in the method of the present invention.

In accordance with the method of the present invention, the flavor is washed with an aqueous alkaline solution having a pH in the range from about 8 to about 14. The aqueous alkaline solution should be sufficiently concentrated so as to efficiently remove the unwanted impurities responsible for the undesirable off-notes. However, excessively concentrated alkaline solutions should be avoided as such solutions adversely effect the flavor characteristics of "good" flavor. Preferably, the aqueous alkaline solution will have a pH in the range from about 10 to about 14. Most preferably, however, the aqueous alkaline solution will have a pH of about 13.

Various aqueous alkaline solutions are contemplated for use in the method of the present invention. Examples of such aqueous alkaline solutions include potassium hydroxide, sodium hydroxide, and similar solutions well known by those skilled in the art. Whatever the aqueous alkaline solution selected for use in the method of the present invention, it is preferred that the solution have a normality (N) of about 0.01 to about 0.5. More preferably, the aqueous alkaline solution will havew a normality in the range from about 0.05 to about 0.2. The most preferred aqueous alkaline solution contemplated for use in the method of the present invention is an aqueous solution of sodium hydroxide having a normality (N) of about 0.1.

The amount of aqueous alkaline solution necessary to wash the flavoring can vary greatly. Generally, the more concentrated the aqueous alkaline solution (i.e. the higher the pH), the less alkaline solution necessary to wash the flavor. However, as excessively concentrated alkaline solutions will adversely affect "good" flavor, it is more desirable to use greater volumes of less concentrated alkaline solution and a greater number of repeat washings than to use solutions with excessively high pH. Preferably, where the aqueous alkaline solution used to wash the flavor has a normality in the range from about 0.01 to about 0.5, from about 1 volume to about 5 volumes aqueous alkaline solution should be used per 1 volume flavor being washed. Most preferably, about 2 volumes to about 3 volumes aqueous alkaline solution will be utilized per 1 volume flavor being washed. The aforesaid ratios of aqueous alkaline solution to flavor are utilized for each of one or more washings.

The flavor may be washed with the aqueous alkaline solution pursuant to any method of washing known by those skilled in the art. For example, washing can be carried out on a small scale by gently shaking the two immiscible liquids in a separatory funnel for about 20 minutes. The resulting mixture is allowed to stand for an amount of time sufficient to permit the mixture to separate into two layers. The lower organic layer containing the flavor is drained off and retained, while the upper aqueous layer is discarded. The washing may be repeated one or more times. Similarly, washing can be carried out on a larger scale by using well known analogous production techniques, as, for example, a Lightnin mixer.

A third alternative washing technique is the use of a continuous washing system wherein flavor and alkaline solution are continually supplied, circulated, and removed in a continuous process. The method of the present invention contemplates the use of any continous washing system known by those skilled in the art.

After washing, the residual moisture remaining in the organic flavor layer may optionally be removed. Preferably, however, residual moisture will be removed from the organic flavor layer prior to its addition to chewing gum or any other confectionary product to which it is to be introduced. The residual moisture is removed primarily for two reasons. First, the residual moisture may over time cause degradation of the flavor. Secondly, residual moisture may contain traces of the impurity responsible for the flavor's undesirable off-notes. The residual moisture remaining with the flavor after washing may be removed by any technique known by those skilled in the art. Preferably, the organic flavor-containing liquid layer will be centrifuged for about 15 to about 20 minutes until clear. Any commercially available centrifuge known in the art is contemplated for use in the method of the present invention. Alternately, the residual moisture can be removed by mixing a drying agent with the organic flavor layer. Examples of suitable drying agents include calcium sulfate, calcium chloride, sodium sulfate, as well as other such similar drying agents known by those skilled in the art. Preferably, anhydrous sodium sulfate is contemplated for use as the drying agent. The amount of drying agent added to the flavor layer will depend on the amount of residual moisture present therein. Generally, an amount of drying agent should be mixed with the flavor layer sufficient to remove all traces of cloudiness therein. Once having absorbed and/or adsorbed the organic flavor layer's residual moisture, the drying agent is removed by filtering the organic flavor layer. Any filtering method known by those skilled in the art is contemplated for use by the method of the present invention. Such method include, for example, gravity filtration, vacuum filtration, and pressure filtration through suitable filter media. In some cases it may be desirable to use both methods of removing residual moisture. In these cases, the washed flavor should be centrifuged first, then treated with a drying agent as described above. The treated flavor is then ready for use in all types of confectionary and medicinal products.

A presently preferred use for the flavor treated according to the method of the present invention is the incorporation of the treated flavor into chewing gum. The treated flavor may be mixed with the chewing gum ingredients at any time during the manufacturing process.

In general, a chewing gum composition comprises a water soluble bulk portion, a water insoluble chewable gum base portion, and, typically water insoluble flavors. The water soluble portion dissipates with a portion of the flavor over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber, as well as natural latexes such as chicle. Resins include polyvinylacetate and terpene resins. Fats and oils may also be included in the gum base including tallow, hydrogenated and partially hydrogenated vegetable oils and cocoa butter. Commonly employed waxes include paraffin, microcrystalline, and natural waxes such as beeswax and carnauba. The insoluble gum base constitutes between about 5 to about 95 weight percent of the gum. Preferably, the insoluble gum base comprises about 10 to about 50 weight percent of the gum, and more preferably about 20 to about 30 weight percent.

The gum base typically also includes a filler component. The filler component may be calcium carbonate, magnesium carbonate, talc, dicalcium phosphate, and the like. The filler may constitute between about 5 to about 60 weight percent of the gum base. Preferably, the filler comprises about 5 to 50 weight percent of the chewing gum base.

The gum base typically also contains softeners, including glycerol monostearate and glycerol triacetate. Further, gum bases may also contain optional ingredients such as antioxidants, colors and emulsifiers. The present invention contemplates employing any commercially acceptable gum base.

The water soluble portion of chewing gum may further comprises softeners, sweeteners, flavors and combinations thereof. The softeners are added to the chewing gum in order to optimize the chewability and mouth feel of the gum. Softeners, also known in the art as plasticizers or plasticizing agents, generally constitute between about 0.1 to about 15 weight percent of the chewing gum. Softeners contemplated by the present invention include glycerin, lecithin and combinations thereof. Further, aqueous sweetener solutions such as those containing sorbitol, hydrogenated starch hydrosylates, corn syrup and combinations thereof may be used as softeners and binding agents in gum.

Sweeteners contemplated by the present invention for use in chewing gum include both sugar and sugarless components. Sugar sweeteners generally include saccharide-containing components commonly known in the chewing gum art which comprise but are not limited to sucrose, dextrose, maltose, dextrin, dried invert sugar, fructose, levelose, galactose, corn syrup solids, and the like, alone or in any combination. Sugarless sweeteners include components with sweetening characteristics but are devoid of the commonly known sugars and comprise but are not limited to sugar alcohols such as sorbitol, mannitol, xylitol, hydrogenated starch hydrosylates, maltitol, and the like, alone or in any combination. Also contemplated for direct addition to the gum are relatively faster releasing high intensity sweeteners such as aspartame, sucrose, acesulfane-K, alitame, and saccharin.

Those skilled in the art will recognize that any combination of sugar and/or sugarless sweeteners may be employed in the chewing gum. Further, those skilled in the art will recognize a sweetener may be present in a chewing gum in whole or in part as a water soluble bulking agent. In addition, the softener may be combined with a sweetener such as an aqueous sweetener solution.

The treated flavor can be used in a chewing gum in amounts of about 0.1 to about 10 weight percent, and preferably from about 0.5 to about 3 weight percent of the gum. Flavors contemplated by the present invention include any liquid flavoring which is of food acceptable quality. More precisely, the present invention contemplates the use of flavors of food acceptable quality that contain at least in part either natural or artificial wintergreen oil and/or methyl salicylate, and/or blends thereof. The aforesaid flavor may be blended with other essential oils, synthetic flavors, or mixtures thereof, including but not limited to oils derived from plants and fruits such as citrus oils, fruit essences, peppermint oil, spearmint oil, clove oil, anise, and the like. Artificial flavoring components are also contemplated by the present invention. Those skilled in the art will recognize that the natural and artificial flavors may be combined in any manner.

Ingredients such as colors, emulsifiers, and pharmaceutical agents may be added to the chewing gum.

In general, chewing gum is manufactured by sequentially adding the various chewing gum ingredients to any commercially available known mixer known in the art. After the ingredients have been thoroughly mixed, the gum mass is discharged from the mixer and shaped into the desired forms such as by rolling into sheets and cutting into sticks, extruding into chunks, or casting into pellets. Generally, the ingredients are mixed by first melting the gum base and adding it to the running mixer. The base may also be melted in the mixer itself. Color may also be added at this time. A softener such as glycerin may then be added next along with syrup and a portion of bulking agent. Further portions of the bulking agents may be added to the mixer. It is to be understood that under proper conditions, the treated flavor of the present invention may be added at any time during the gum manufacturing process.

The entire mixing procedure typically takes from about 5 minutes to about 15 minutes, but longer mixing times may sometimes be required.

Those skilled in the art will recognize that variations of the above described procedure may be followed. It is to be understood that an equivalent of changes and modifications of the embodiments described above are also contemplated by the present invention. The following examples are not to be construed as limitations upon the present invention, but are included merely as an illustration of the various embodiments.

EXAMPLES

Example 1

A starting flavor blend containing about 66% artificial oil of wintergreen and about 34% of other flavors (mostly peppermint oil and peppermint components) was known to have an undesirable off-note. Gas chromatographic analysis showed a phenol level of about 135 parts per million (ppm) by weight in the above-described flavor blend.

Four grams of sodium hydroxide was dissolved in one liter of distilled water to make a 0.1 normal solution with a pH of about 13. To a separatory funnel, 30 milliliters of the flavor blend described above and 70 milliliters of the sodium hydroxide solution were added. The mixture was then agitated vigorously for about 20 minutes after which the lower organic liquid phase containing the flavor blend was drained off and the upper aqueous phase was discarded. The once-washed flavor blend was then analyzed by gas chromatography and found to contain about 65 ppm of phenol. A small quantity of this once-washed flavor was set aside for sensory testing.

The above described wash procedure was repeated with the once-washed flavor blend, the resulting thrice-washed flavor blend was then analyzed pursuant to gas chromatography. The resulting flavor blend, having twice been washed according to the method of the present invention, had a phenol level of about 35 ppm. A portion of the twice-washed flavor was set aside for sensory testing.

The above described procedure was repeated with the twice-washed flavor, the resulting thrice-washed flavor was then analyzed by gas chromatography and found to have a phenol level below the threshold level of detection—about 5 ppm. This thrice-washed flavor was likewise set aside for sensory testing.

In order to remove the residual water remaining in the washed flavors, sodium sulfate was added to all three flavor samples mentioned above until cloudiness disappeared. The above mixtures were then agitated briefly and filtered to remove the sodium sulfate.

The above three flavor solutions were incorporated into sugar solutions for taste tests. The sugar solutions were prepared by pipetting 0.1 milliliters of the flavor into a 10 milliliter volumetric flask which was then filled to volume with 95% ethanol. One milliliter of the aforesaid mixture was then added to a 100 milliliter volumetric flask, which was then filled to volume with 5% weight/volume aqueous sucrose solution.

Taste Test #1

Three solutions prepared as above were taste-tested by five expert panelists in a blind taste test. Specifically, a flavor blend known to have no undesirable off-notes was incorporated into a sugar solution as a control (the "good" flavor). The above described starting flavor blend having 135 ppm phenol was incorporated into a sugar solution as described above. Finally, the "once-washed" flavor blend described above having 65 ppm phenol was likewise incorporated into a sugar solution as described above. Two of the five panelists described the starting blend flavor having 135 ppm phenol as having undesirable off-notes. The other two samples were described as having no undesirable off-notes by all five of the panelists.

Taste Test #2

Sugar solutions incorporating the following flavors were prepared as described above. Specifically, the following flavors were incorporated into super solutions: the good flavor blend known to have no undesirable off-notes; the starting flavor blend having 135 ppm phenol, the twice-washed flavor blend having 35 ppm phenol, and the thrice-washed flavor having less than 5 ppm phenol. After blind taste tests, all five of the panelists described the starting flavor blend as manifesting undesirable off-notes. The other three sugar solutions containing the flavor blend described above, however, did not have undesirable off-notes associated therewith according to each of the five panelists.

Example 2

The wash procedure described above in Example 1 was repeated with the same starting flavor blend except that the starting flavor blend was subjected to two washings as opposed to three. The twice-washed flavor blend was determined to have about 30 ppm phenol according to gas chromatography. A chewing gum was prepared having the composition specified below for use in the present example.

TABLE I

| Components | % by weight of the chewing gum |
| --- | --- |
| Sorbitol | 45.86 |
| Gum Base | 26.80 |
| Hydrogenated Starch Hydrolysate Syrup | 7.80 |
| Glycerin | 8.94 |
| Mannitol | 8.00 |
| Aspartame | 0.24 |
| Color | 0.12 |
| Wintergreen Blend[1] | 1.70 |
| Peppermint Flavor[2] | 0.54 |
| | 100% |

[1] The Wintergreen Blend is the flavor described in Example 1 above.
[2] A mixture of peppermint oil and peppermint oil components.

Three batches of chewing gum were prepared according to the formulations of TABLE 1. One batch employed the starting wintergreen flavor blend of Example 1 having a phenol content of about 135 ppm. A second control batch used a known "good" wintergreen flavor blend. Finally, the third batch utilized the twice-washed wintergreen flavor blend having 30 ppm phenol. The three chewing gums were evaluated by expert panelists in a four minute chew.

The control chewing gum was described as having "clean high quality flavor." The chewing gum using the twice-washed flavor was similarly described by each of the five panelists. However, the chewing gum utilizing the starting wintergreen flavor blend of Example 1 having 135 ppm phenol was described as having a flavor with undesirable off-notes described as "soapy," "solventy," and "chemical." Furthermore, this chewing gum was described as lacking intense wintergreen flavor.

Example 3

In this example, 200 milliliters (ml) of the starting flavor described in Example 1 having about 135 ppm by weight phenol were mixed with 466 ml of a 0.1N sodium hydroxide solution. The resulting mixture was placed in a 1,000 ml stainless steel beaker and agitated for 20 minutes with a Lightnin mixer having an average speed of about 300 rotations per minute (RPM). The resulting emulsion was placed in a separatory funnel and allowed to separate overnight.

The emulsion separated into two layers, a top clear, yellowish layer and a bottom milky, opaque layer containing the flavor. The bottom flavor-containing organic layer was drawn off in portions and centrifuged at 3,000 RPM for about 12 to about 15 minutes, until the layer yielded a clear liquid having fine insoluble droplets floating on the top and dispersed throughout the liquid. The insoluble droplets comprised residual moisture remaining after washing the flavor and were removed by using approximately 10 grams sodium sulfate. The sodium sulfate was then filtered out of the flavor by gravity filtration through filter paper.

After completing the above steps, the amount of flavor recovered was determined to by 180 ml. As the above process began with 200 ml of flavor, the method of the present invention provides for at least a 90% recovery of the flavor. Furthermore, the recovered flavor had its phenol level reduced to about 52 ppm phenol.

Example 4

In this example, 14 pounds of the starting flavor described in Example 1 having about 135 ppm by weight phenol were mixed with about 42 pounds 0.1N sodium hydroxide solution. The resulting mixture was agitated for 20 minutes and then allowed to seperate overnight. The flavor containing organic layer was drawn off and dried by mixing the organic layer with about 5.5 pounds of sodium sulfate. Thereafter, the sodium sulfate was filtered out of the flavor layer by gravity filtration through filter paper.

The flavor was then measured for its phenol content and found to have about 47 ppm phenol—a reduction in phenol content of about 66%. Accordingly, as this example demonstrates, the method of the present invention can be utilized on a manufacturing scale.

We claim:

1. A method of manufacturing a wintergreen-flavored chewing gum being substantially free of undesirable off-notes comprising the following steps:
   providing a flavor consisting of methyl salicylate;
   providing an aqueous alkaline solution having a pH in the range from about 8 to about 14 and selected from the group consisting of sodium hydroxide, potassium hydroxide, sodium bicarbonate, sodium carbonate and mixtures thereof;
   washing the flavor with the aqueous alkaline solution;
   providing a chewing gum composition; and
   mixing the washed flavor with the chewing gum composition so that the flavor comprises from about 0.1% to about 10% by weight of the chewing gum composition.

2. The method of claim 1 wherein the washing of the flavor with the aqueous alkaline solution comprises a continous process.

3. The method of claim 1 wherein residual moisture is removed from the flavor after the flavor has been washed with the aqueous alkaline solution.

4. The method of claim 3 wherein residual moisture is removed from the flavor by centrifugation.

5. The method of claim 3 wherein residual moisture is removed from the flavor pursuant to the additional steps comprising:

mixing the flavor and an amount of drying agent sufficient to remove residual moisture present in the flavor; and filtering the flavor so as to remove the drying agent.

6. The method of claim 5 wherein the drying agent comprises a drying agent selected from the group consisting of sodium sulfate, calcium chloride, calcium sulfate, and mixtures thereof.

7. The method of claim 3 wherein residual moisture is removed from the flavor pursuant to the steps comprising:

centrifuging the flavor;

mixing the flavor and an amount of drying agent sufficient to remove the residual moisture present in the flavor; and filtering the flavor so as to remove the drying agent.

8. The method of claim 3 wherein the aqueous alkaline solution has a pH in the range from about 10 to about 14.

9. The method of claim 8 wherein the aqueous alkaline solution has a normality in the range from about 0.01 to about 0.5.

10. The method of claim 9 wherein the aqueous alkaline solution has a normality in the range from about 0.05 to about 0.2.

11. The method of claim 10 wherein from about 1 volume flavor is washed with from about 1 volume to about 5 volumes aqueous alkaline solution.

12. The method of claim 11 wherein from about 1 volume flavor is washed with from about 2 volumes to about 3 volumes aqueous alkaline solution.

13. The method of claim 12 wherein the aqueous alkaline solution has a pH of about 13.

14. The method of claim 12 wherein the aqueous alkaline solution consisting of a solution of sodium hydroxide.

15. The method of claim 11 wherein the washing is repeated one or more times.

16. A method of manufacturing a wintergreen-flavored chewing gum being substantially free of undesirable off-notes comprising the following steps:

providing a flavor consisting of methyl salicylate;

providing an aqueous sodium hydroxide solution having a normality in the range from about 0.5 to about 0.2 and having a pH in the range from about 10 to about 14;

washing about 1 volume of the flavor with from about 1 volume to about 5 volumes of the sodium hydroxide solution;

removing residual moisture from the flavor;

providing a chewing gum composition; and mixing the washed flavor with the chewing gum composition so that the flavor comprises from about 0.1% to about 10% by weight of the chewing gum composition.

17. A method of treating flavor so as to eliminate the undesirable off-notes associated therewith comprising the following steps:

providing a flavor consisting of methyl salicylate;

providing an aqueous alkaline solution having a pH in the range from about 8 to about 14 and selected form the group consisting of sodium hydroxide, potassium hydroxide, sodium bicarbonate, sodium carbonate and mixtures thereof; and washing the flavor with the aqueous alkaline solution.

18. The method of claim 17 wherein the washing of the flavor with the aqueous alkaline solution comprises a continous process.

19. The method of claim 17 further comprising the step of removing residual moisture from the flavor after the flavor has been washed with the aqueous alkaline solution.

20. The method of claim 19 wherein residual moisture is removed from the flavor by centrifugation.

21. The method of claim 19 wherein residual moisture is removed from the flavor pursuant to the additional steps comprising:

mixing the flavor and an amount of drying agent sufficient to remove residual moisture present in the flavor; and filtering the flavor so as to remove the drying agent.

22. The method of claim 21 wherein the drying agent comprises an agent selected from the group consisting of sodium sulfate, calcium chloride, calcium sulfate, and mixtures thereof.

23. The method of claim 19 wherein residual moisture is removed from the flavor pursuant to the steps comprising:

centrifuging the flavor;

mixing the flavor and an amount of drying agent sufficient to remove the residual moisture present in the flavor; and filtering the flavor so as to remove the drying agent.

24. The method of claim 19 wherein the aqueous alkaline solution has a pH in the range from about 10 to about 14.

25. The method of claim 24 wherein the aqueous alkaline solution has a normality in the range from about 0.01 to about 0.5.

26. The method of claim 24 wherein the aqueous alkaline solution has a normality in the range from about 0.05 to about 0.2.

27. The method of claim 26 wherein from about 1 volume flavor is washed with from about 1 volume to about 5 volumes aqueous alkaline solution.

28. The method of claim 27 wherein from about 1 volume flavor is washed with from about 2 volumes to about 3 volumes aqueous alkaline solution.

29. The method of claim 28 wherein the aqueous alkaline solution has a pH of about 13.

30. The method of claim 28 wherein the aqueous alkaline solution is a solution of sodium hydroxide.

31. The method of claim 27 wherein the washing is repeated one or more times.

32. A method of treating flavor so as to eliminate the undesirable off-notes associated therewith comprising the following steps:

providing a flavor consisting of methyl salicylate;

providing a sodium hydroxide solution having a normality in the range from about 0.05 to about 0.2 and a pH in the range from about 10 to about 14;

washing about 1 volume of the flavor with from about 1 volume to about 5 volumes of the sodium hydroxide solution; and removing residual moisture from the flavor.

* * * * *